US008856883B2

(12) United States Patent
Chou et al.

(10) Patent No.: US 8,856,883 B2
(45) Date of Patent: Oct. 7, 2014

(54) SYSTEM AND METHOD FOR PROTECTING MAC CONTROL MESSAGES

(75) Inventors: Joey Chou, Scottsdale, AZ (US); Xiangying Yang, Portland, OR (US); Muthaiah Venkatachalam, Beaverton, OR (US); Elad Levy, Nes Ziona (IL); Shantidev Mohanty, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 344 days.

(21) Appl. No.: 13/094,387

(22) Filed: Apr. 26, 2011

(65) Prior Publication Data

US 2012/0011569 A1    Jan. 12, 2012

Related U.S. Application Data

(60) Provisional application No. 61/361,880, filed on Jul. 6, 2010.

(51) Int. Cl.
*G06F 21/00* (2013.01)
*H04L 29/06* (2006.01)
*H04L 9/06* (2006.01)
*H04W 12/10* (2009.01)
*H04L 9/32* (2006.01)

(52) U.S. Cl.
CPC ......... *H04W 12/10* (2013.01); *H04L 2209/805* (2013.01); *H04L 9/32* (2013.01); *H04L 63/123* (2013.01); *H04L 9/0637* (2013.01)
USPC ................. 726/4; 713/168; 380/37; 380/270; 455/458

(58) Field of Classification Search
CPC .................................................. H04L 9/0637

USPC .................................. 726/4; 455/458; 380/37
See application file for complete search history.

(56) References Cited

U.S. PATENT DOCUMENTS

| 2008/0044014 A1* | 2/2008 | Corndorf ........................ 380/37 |
| 2009/0170474 A1* | 7/2009 | Bright ........................... 455/411 |
| 2009/0327716 A1* | 12/2009 | Raju et al. ...................... 713/168 |
| 2010/0004002 A1* | 1/2010 | Hahn et al. ................. 455/456.1 |
| 2010/0214978 A1* | 8/2010 | Chen et al. ..................... 370/328 |
| 2012/0026924 A1* | 2/2012 | Zhang et al. .................... 370/310 |

OTHER PUBLICATIONS

"Packet Leashes: A Defense against Wormhole Attacks in Wireless Networks"; Hu et al; INFOCOM 2003. Twenty-Second Annual Joint Conference of the IEEE Computer and Communications. IEEE Societies; Date of Conference: Mar. 30-Apr. 3, 2003.*

"Cooperative Asynchronous Multichannel MAC: Design, Analysis, and Implementation"; Luo et al; Mobile Computing, IEEE Transactions on, 2009. 15 pages.*

* cited by examiner

*Primary Examiner* — Jason Lee

(74) *Attorney, Agent, or Firm* — Cool Patent, P.C.

(57) ABSTRACT

A system to protect MAC control messages is presented. In one embodiment, the system comprises a processor, a memory coupled to the processor, and a communication device coupled to the processor to communicate wirelessly over multiple sub-channels in an orthogonal frequency division multiple access (OFDMA) wireless network. The communication device is operable to determine that a MAC control message is protected if an indicator within the MAC control message is set. The communication device validates, if the indicator is set, integrity of the MAC control message in conjunction with a CMAC (cipher-message authentication code) tuple concatenated with the MAC control message.

20 Claims, 5 Drawing Sheets

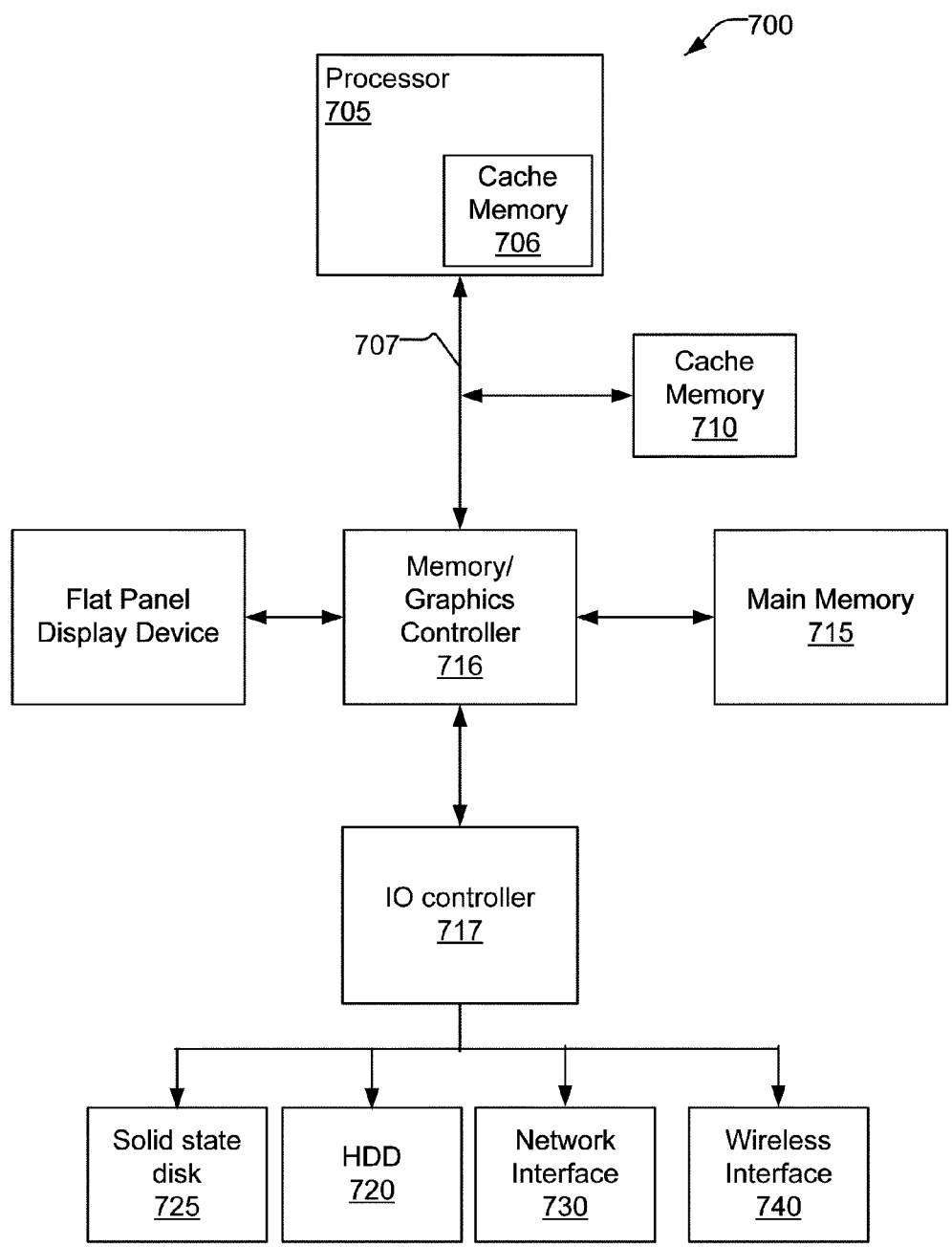

SYSTEM AND METHOD FOR PROTECTING MAC CONTROL MESSAGES

CROSS-REFERENCE TO RELATED APPLICATIONS

This application claims the benefit of U.S. Provisional Application No. 61/361,880, filed on Jul. 6, 2010, entitled "Advanced Wireless Communication Systems And Techniques", and the contents of which incorporated herein by reference as if set forth herein in full.

FIELD OF THE INVENTION

Embodiments of the invention are related to wireless communication systems, more particularly, for protecting MAC (medium access control) control messages.

BACKGROUND OF THE INVENTION

Wireless access systems and radio access technologies (RATs) have been developed to provide different types of services. Some examples of the wireless access systems include wireless local area networks (WLANs), (such as IEEE 802-based networks), and cellular networks, (such as universal mobile telecommunication systems (UMTS) terrestrial radio access network (UTRAN), an evolved UTRAN (E-UTRAN), a GPRS/EDGE radio access network (GE-RAN), or the like). E-UTRAN (evolved UMTS Terrestrial Radio Access Network) is the air interface of 3GPP's Long Term Evolution (LTE) upgrade path for mobile networks.

Mobile Worldwide Interoperability for Microwave Access (WiMAX) is a broadband wireless access technology based on Institute of Electrical and Electronics Engineers (IEEE) 802.16 standard. Mobile WiMAX uses a scalable orthogonal frequency division multiple access (OFDMA) scheme to deliver wireless broadband packet data services to mobile terminals.

A base station or a subscriber station may support management message integrity protection based on cipher-message authentication code (CMAC) together with the AES block cipher. A message received, that contains a CMAC tuple, shall not be considered authentic if the length field of the tuple is incorrect, or if the locally computed value of the digest does not match the digest in the message.

In some systems, for example, in conjunction with the standard of the IEEE 802.16-2009, a CMAC tuple is defined in TLV format in the MAC management message. Since the CMAC tuple is always the last attribute in the message, a receiver can easily locate the part of message required for CMAC verification by excluding the CMAC TLV. In some systems, for example, in conjunction with the standard of the IEEE 802.16m, the MAC control messages are defined in ASN.1 format using PER (packed encoding rules) with the byte unaligned option. If the CMAC tuple is included in the ASN.1 message, the receiver may not be able to locate the part of message to be authenticated by using AES-CMAC algorithm.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

FIG. 5 illustrates a computer system for use with one embodiment of the present invention.

DETAILED DESCRIPTION OF THE INVENTION

Figure 1:
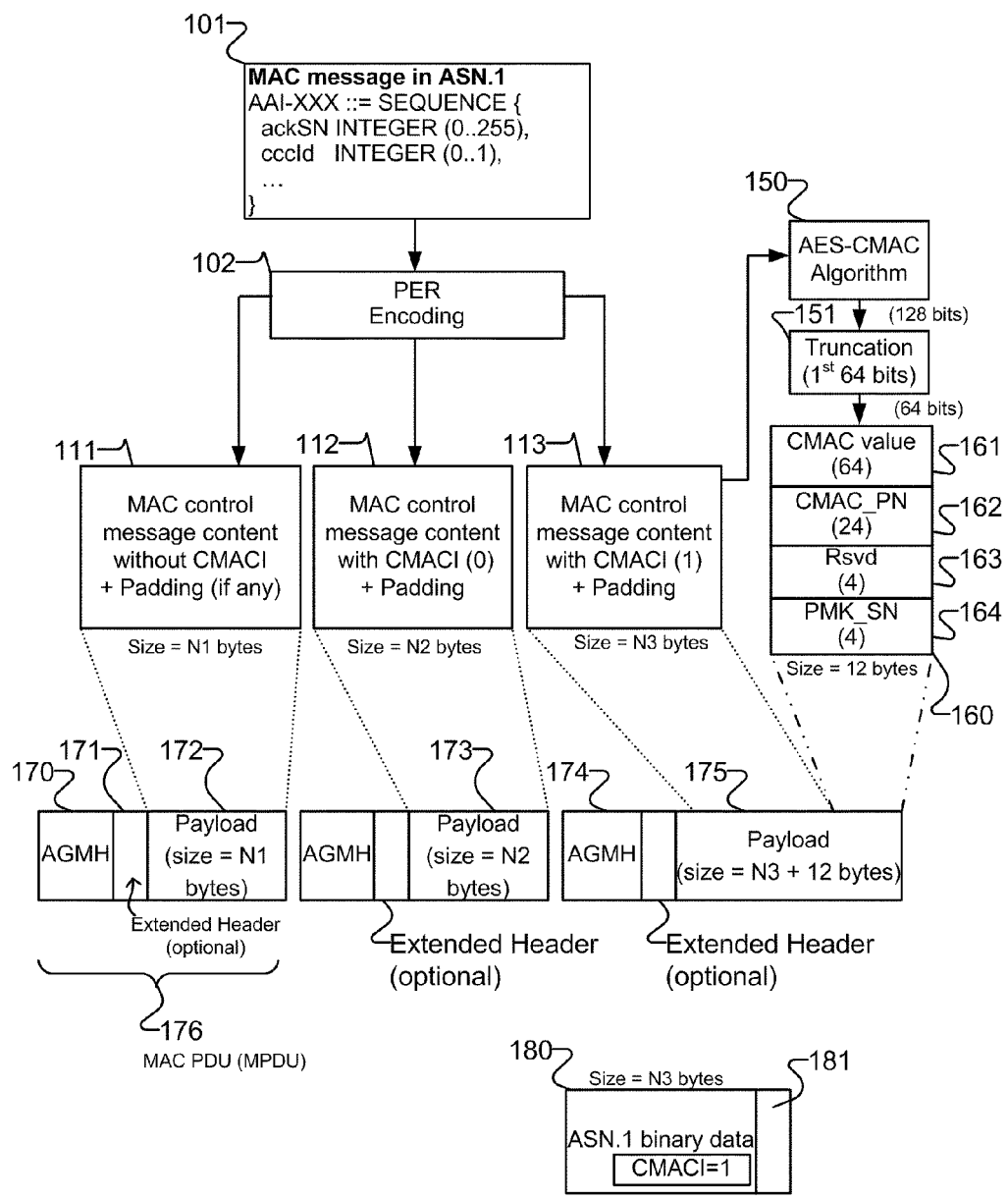
FIG. 1 is a block diagram of an embodiment of MAC protocol data unit (MPDU) construction with CMAC protection.

A system to protect MAC control messages is presented. In one embodiment, the system comprises a processor, a memory coupled to the processor, and a communication device coupled to the processor to communicate wirelessly over multiple sub-channels in an orthogonal frequency division multiple access (OFDMA) wireless network. The communication device is operable to determine that a MAC control message is protected if an indicator within the MAC control message is set. The communication device validates, if the indicator is set, integrity of the MAC control message in conjunction with a CMAC (cipher-message authentication code) tuple concatenated with the MAC control message.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

The methods and apparatuses described herein are for performing authentication or validation of MAC messages. Specifically, the methods and apparatuses are primarily discussed in reference to common computer systems. The methods and apparatuses, however, are not so limited, as they may be implemented on or in association with any integrated circuit device or system, such as cell phones, personal digital assistants, embedded controllers, mobile platforms, desktop platforms, and server platforms, as well as in conjunction with other resources.

Overview

A system to protect MAC control messages is presented. In one embodiment, the system comprises a processor, a memory coupled to the processor, and a communication device coupled to the processor to communicate wirelessly over multiple sub-channels in an orthogonal frequency division multiple access (OFDMA) wireless network. The communication device is operable to determine that a MAC control message is protected if an indicator within the MAC control message is set. The communication device validates, if the indicator is set, integrity of the MAC control message in conjunction with a CMAC (cipher-message authentication code) tuple concatenated with the MAC control message.

FIG. 1 is a block diagram of an embodiment of MPDU (MAC protocol data unit) construction with CMAC protection. Many related components have not been shown to avoid obscuring the invention. Referring to FIG. 1, in one embodiment, the MAC message (see 101) in ASN.1 (abstract syntax notation one) format is encoded according to packed encoding rules (PER 102).

In one embodiment, a 12-byte CMAC tuple is included in some MAC control messages (e.g., MPDU payload 175) to enable a receiver (e.g., a mobile station, a base station, user equipment, UTRAN, etc.) to check the authenticity and the integrity of the control messages. In one embodiment, MPDU 176 comprises MPDU payload 175, AGMH, and an optional extended header.

In one embodiment, a CMAC tuple includes, for example, the following fields:
1. PMK_SN 164 (4 bits): The sequence number of PMK used to derive AK;
2. Reserved 163 (4 bits): Added for byte alignment;
3. CMAC_PN 162 (24 bits): Current CMAC_PN_U for uplink or current CMAC_PN_D for downlink; and
4. CMAC value 161 (64 bits): The most significant 64 bits of the 128-bit CMAC value before truncation 151.

In one embodiment, in MAC control message 113 (which is protected with CMAC verification), ASN.1 encoded data is followed by a CMAC tuple. In one embodiment, the ASN.1 encoded data is referred to herein as the MAC control message content data. The MAC control message content data (e.g., MAC control message content 112, MAC control message content 113) comprises the control message with an indicator (flag) and padding bits (if necessary for byte alignment).

In one embodiment, a CMAC indicator (CMACI) is an indicator or a flag defined in MAC control message 101. The CMACI indicates whether the MAC control message is protected (to be protected) using CMAC or otherwise.

In one embodiment, CMACI is set to "0" or is clear to indicate that the MAC control message is not protected using CMAC (for example, message 112). For example, the ASN.1 binary data and padding bits will become MAC PDU payload 173 with the size M=N2 bytes. N2 is the number of bytes of the MAC control message content data inclusive of padding when needed.

In one embodiment, absence of a CMACI in a MAC control message indicates that the MAC control message is not protected using CMAC (for example, message 111). For example, the ASN.1 binary data and padding bits will become MAC PDU payload 172 with the size M=N1 bytes. N1 is the number of bytes of the MAC control message content data plus padding when needed.

In one embodiment, CMACI is set to "1" to indicate that the MAC control message is protected using CMAC and also that a CMAC tuple is present (following the MAC control massage content) in the MAC PDU payload. In one embodiment, MAC control message content 113 and padding bits are sent to AES-CMAC module 150 to generate a 128-bit CMAC value. In one embodiment, truncation 151 chooses to use the 64 most significant bits of the result from the AES-CMAC module 150. The 64-bit value will become CMAC value 161 after truncation 151.

In one embodiment, a CMAC protected MAC control message includes MAC control message content 113 or ASN.1 encoded data 113 followed by the CMAC tuple (e.g., CMAC tuple 160). For example, payload 175 includes MAC control message content data (CMACI='1'), padding bits thereof, and CMA tuple 160. The MAC PDU payload (e.g., payload 175) contains the ASN.1 binary data, padding bits (if any), and concatenated by CMAC tuple 160. The size of the payload is M=(N3+12) bytes. N3 is the number of bytes of the MAC control message content data inclusive of padding bits.

In one embodiment, the header of a MAC control message is referred to herein as advanced generic MAC header (AGMH) (e.g., AGMH 170, AGMH 174). In one embodiment, optional headers (e.g., 171) present in a MAC control message. In one embodiment, MAC control message content data 113 is equal to ASN.1 binary data 180 and padding 181.

Figure 2:
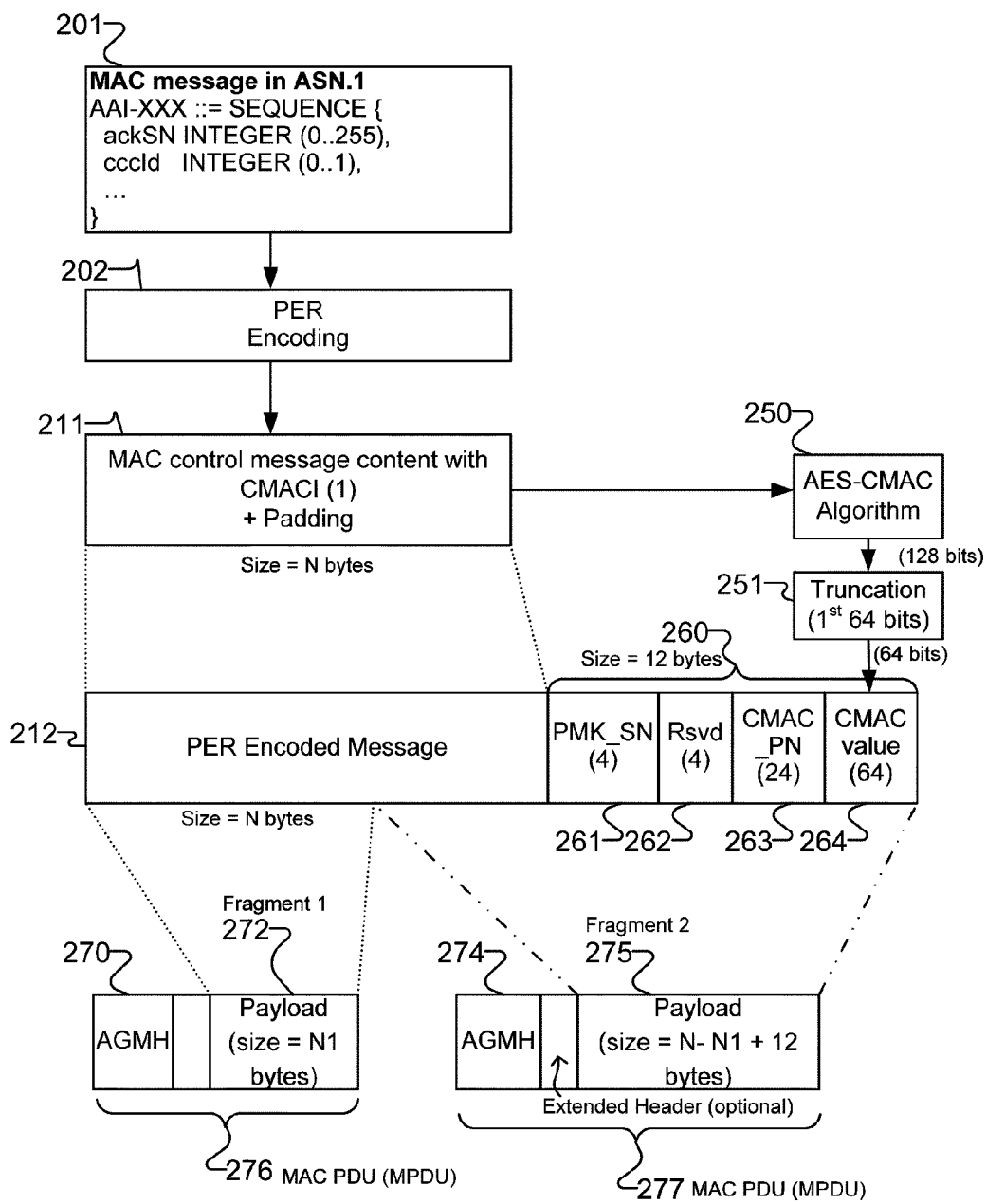
FIG. 2 is a block diagram of an embodiment of MPDU construction of a fragmented MAC control message with CMAC protection.

FIG. 2 is a block diagram of an embodiment of MPDU construction of a fragmented MAC control message with CMAC protection. Referring to FIG. 2, in one embodiment, MAC message 201 is encoded in accordance with PER 202 and becomes MAC control message content data 211.

In one embodiment, MAC control message content data 211 include CMACI and padding bits (if necessary). The size of MAC control message content data 211 is N bytes. In one embodiment, MAC control message content data 211 is sent to AES-CMAC module 250 for the calculation of the CMAC value. In one embodiment, the result of AES-CMAC module 250 is 128 bits in length. The result is truncated (truncation 251) such that the first 64 most significant bits are used as CMAC value 264.

In one embodiment, CMAC tuple 260 includes PMK_SN 261, reserved_bits 262, CMAC_PN 263, and CMAC value 264. In one embodiment, MAC control message content data 211 and CMAC tuple 260 is combined into data 212.

In one embodiment, PER encoded message 212 (e.g., with the size=N bytes) is divided into two segments/fragments. A first MAC PDU (MAC PDU 276) includes AGMH 270, an optional extended header, and payload 272 to store the first fragment of data 212 (e.g., with the size=N1 bytes). A second MAC PDU (MAC PDU 277) includes AGMH 274, an optional extended header, and payload 275 to store the second fragment of data 212 and CMAC tuple 260. In one embodiment, payload 275 includes CMAC tuple 260 which is 12 bytes in length and a part of MAC control message content data 211.

In one embodiment, if the length of payload 272 is N1 bytes, the length of payload 275 is equal to N−N1+12 bytes. In one embodiment, CMAC tuple 260 is sent in the last MAC control message fragment (e.g., payload 275). In one embodiment, an MAC control message is divided into two or more fragments. The CMAC tuple is attached with the last fragment of the two or more fragments.

Figure 3:
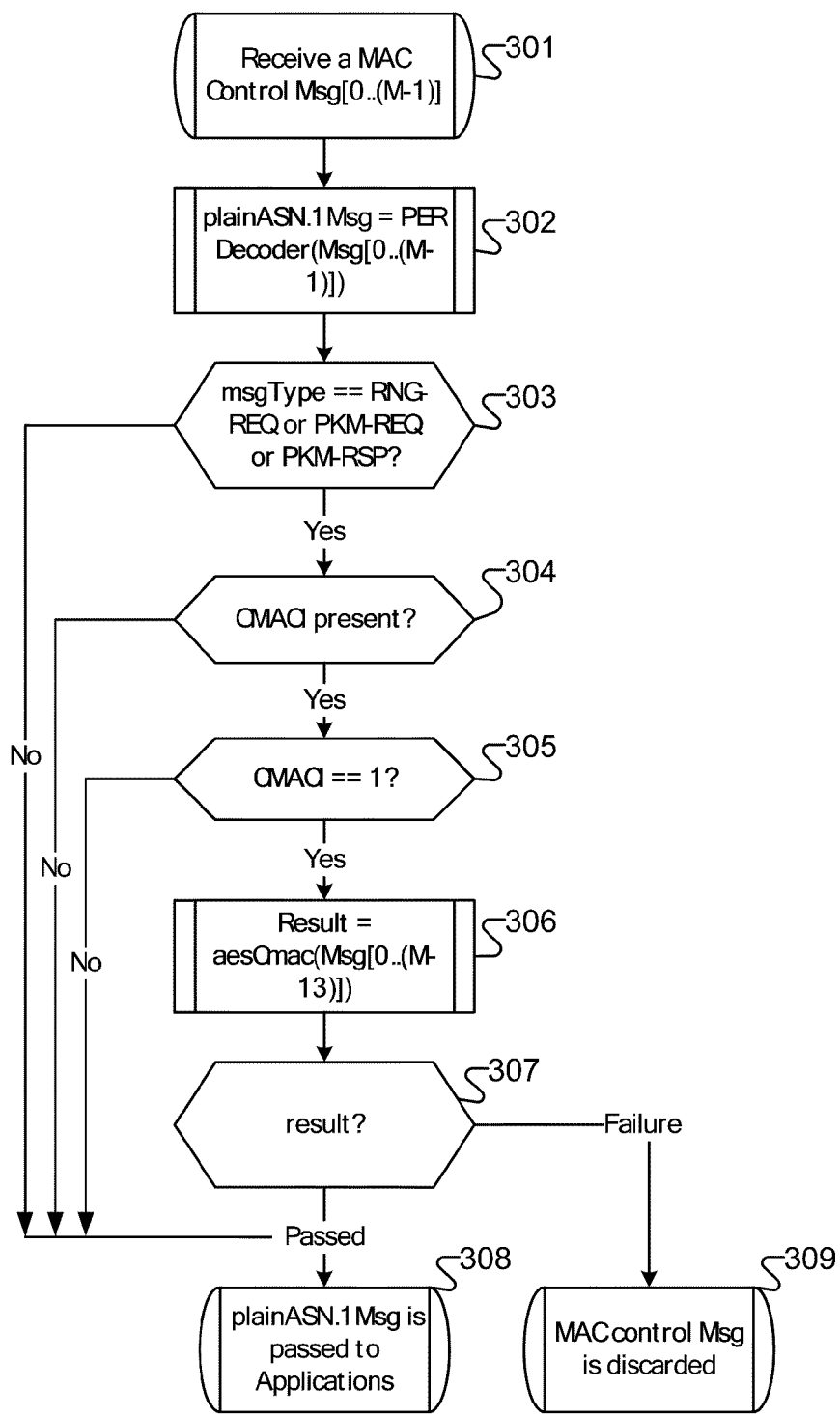
FIG. 3 is a flow diagram of one embodiment of a process for receiving a MAC control message.

FIG. 3 is a flow diagram of one embodiment of a process for receiving MAC control message. The process is performed by processing logic that may comprise hardware (circuitry, dedicated logic, etc.), software (such as one that is run on a general-purpose computer system or a dedicated machine), or a combination of both. In one embodiment, the process is performed in conjunction with a communication apparatus. In one embodiment, the process is performed by one or more computer systems with respect to FIG. 5.

Referring to FIG. 3, in one embodiment, processing logic begins by receiving a MAC PDU that is encoded in conjunction with PER (process block 301). The MAC control message is M bytes in length.

In one embodiment, processing logic decodes an ASN.1 PER encoded MAC message to generate the plain ASN.1 message which will be processed by MAC software (process block 302).

In one embodiment, processing logic determines the type of the message (process block 303). Processing logic determines whether the control message is one of the message types including, such as, for example, AAI-RNG-REQ, AAI-PKM-REQ, and AAI-PKM-RSP.

In one embodiment, processing logic checks whether the CMACI (cipher-based MAC indicator) is present (processing block 304). If the indicator is present, processing logic checks the value/status of the CMACI. In one embodiment, if the CMACI is set to "1" (process block 305), processing logic sends the first (M-12) bytes of the PER encoded control message (e.g., MAC PDU with respect to process block 301) for CMAC verification (process block 306).

In one embodiment, processing logic (e.g., AEC-CMAC module 150 with respect to FIG. 1) verifies the result of CMAC authentication/verification/integrity checking (process block 307). If the verification result is valid, processing logic sends the plain ASN.1 message to applications (process block 308). Otherwise, the message is discarded (process block 309).

In one embodiment, processing logic determines that the CMAC verification is not required if (1) the message type is not within the scope of CMAC verification; (2) the CMACI is not present in the control message; or (3) the CMACI is set to "0" (i.e., the CMACI is clear). In one embodiment, processing logic skips the CMAC verification for the control message if the CMAC verification is not required.

In one embodiment, processing logic determines that a CMAC verification is required if (1) the message type is within the scope of CMAC verification; and (2) the CMACI is present in the control message and is set to "1".

In one embodiment, the process is performed in conjunction with a base station, a mobile station, or both depending on the RAT. In one embodiment, a base station is a transmitter in a downstream or downlink case. A transmitter may be interchangeably referred to as an advance base station, a base station (BS), an enhanced Node B (eNB), or an access point (AP) at the system level herein. In this downlink case, a mobile station is a receiver. A receiver may be interchangeably referred to as an advanced mobile station (AMS), a mobile station (MS), a subscriber station (SS), a user equipment (UE), or a station (STA) at the system level herein. In one embodiment, a base station is a receiver and a mobile station is a transmitter, in an upstream or uplink case. Further, the terms ABS, BS, eNB, and AP may be conceptually interchanged, depending on which wireless protocol is being used, so a reference to BS herein may also be seen as a reference to either of ABS, eNB, or AP. Similarly, a reference to MS herein may also be seen as a reference to either of AMS, SS, UE, or STA.

Figure 4:
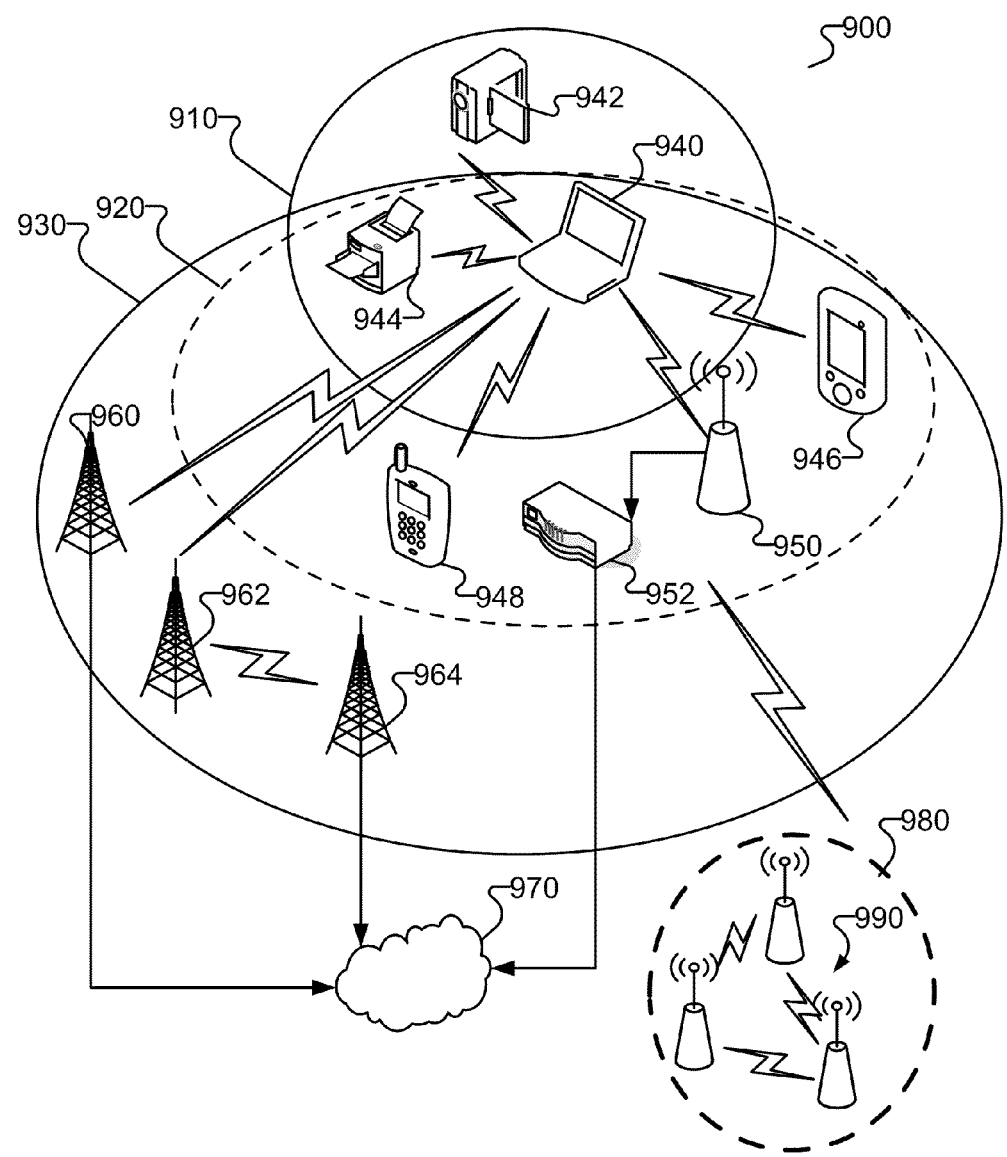
FIG. 4 is a diagram representation of a wireless communication system in accordance with one embodiment of the invention.

FIG. 4 is a diagram representation of a wireless communication system in accordance with one embodiment of the invention. Referring to FIG. 4, in one embodiment, wireless communication system 900 includes one or more wireless communication networks, generally shown as 910, 920, and 930.

In one embodiment, the wireless communication system 900 includes a wireless personal area network (WPAN) 910, a wireless local area network (WLAN) 920, and a wireless metropolitan area network (WMAN) 930. In other embodiments, wireless communication system 900 includes additional or fewer wireless communication networks. For example, wireless communication network 900 includes additional WPANs, WLANs, and/or WMANs. The methods and apparatus described herein are not limited in this regard.

In one embodiment, wireless communication system 900 includes one or more subscriber stations (e.g., shown as 940, 942, 944, 946, and 948). For example, the subscriber stations 940, 942, 944, 946, and 948 include wireless electronic devices such as, for example, a desktop computer, a laptop computer, a handheld computer, a tablet computer, a cellular telephone, a pager, an audio/video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart-rate monitor, a blood-pressure monitor, etc.), and other suitable fixed, portable, or mobile electronic devices. In one embodiment, wireless communication system 900 includes more or fewer subscriber stations.

In one embodiment, the aforementioned devices are shown as discrete components. Other embodiments are possible in which some or all of these units are integrated within a device or within other components. In other embodiments, the aforementioned devices are distributed throughout a system in hardware, software, or some combination thereof. It will be appreciated by those skilled in the art that other Radio Access Technology systems may be used while maintaining approximately the same characteristic.

In one embodiment, subscriber stations 940, 942, 944, 946, and 948 use a variety of modulation techniques, such as spread-spectrum modulation (e.g., direct-sequence code division multiple access (DS-CDMA), frequency-hopping code division multiple access (FH-CDMA), or both), time-division multiplexing (TDM) modulation, frequency-division multiplexing (FDM) modulation, orthogonal frequency-division multiplexing (OFDM) modulation, multi-carrier modulation (MCM), other suitable modulation techniques, or combinations thereof to communicate via wireless links.

In one embodiment, laptop computer 940 operates in accordance with suitable wireless communication protocols that require very low power, such as, for example, Bluetooth®, ultra-wide band (UWB), radio frequency identification (RFID), or combinations thereof to implement the WPAN 910. In one embodiment, laptop computer 940 communicates with devices associated with the WPAN 910, such as, for example, video camera 942, printer 944, or both via wireless links.

In one embodiment, laptop computer 940 uses direct-sequence spread-spectrum (DSSS) modulation, frequency-hopping spread-spectrum (FHSS) modulation, or both to implement the WLAN 920 (e.g., a basic service set (BSS) network in accordance with the 802.11 family of standards developed by the Institute of Electrical and Electronic Engineers (IEEE) or variations and evolutions of these standards). For example, laptop computer 940 communicates with devices associated with the WLAN 920, such as printer 944, handheld computer 946, smart phone 948, or combinations thereof via wireless links.

In one embodiment, laptop computer 940 also communicates with access point (AP) 950 via a wireless link. AP 950 is operatively coupled to router 952 as described in further detail below. Alternatively, AP 950 and router 952 may be integrated into a single device (e.g., a wireless router).

In one embodiment, laptop computer 940 uses OFDM modulation to transmit large amounts of digital data by splitting a radio frequency signal into multiple small sub-signals, which in turn, are transmitted simultaneously at different frequencies. In one embodiment, laptop computer 940 uses OFDM modulation to implement WMAN 930. For example, laptop computer 940 operates in accordance with the 802.16 family of standards developed by IEEE to provide for fixed, portable, mobile broadband wireless access (BWA) networks (e.g., the IEEE std. 802.16, published 2004), or combinations thereof to communicate with base stations, shown as 960, 962, and 964, via wireless link(s). For example, laptop computer 940 operates in accordance with LTE, advanced LTE, 3GPP2, 4G or related versions thereof.

Although some of the above examples are described above with respect to standards developed by IEEE, the methods and apparatus disclosed herein are readily applicable to many specifications, standards developed by other special interest groups, standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.), or combinations thereof. The methods and apparatus described herein are not limited in this regard.

WLAN 920 and WMAN 930 are operatively coupled to network 970 (public or private), such as, for example, the Internet, a telephone network (e.g., public switched telephone network (PSTN)), a local area network (LAN), a cable network, and another wireless network via connection to an Ethernet, a digital subscriber line (DSL), a telephone line, a coaxial cable, any wireless connection, etc., or combinations thereof.

In one embodiment, WLAN 920 is operatively coupled to network 970 via AP 950 and router 952. In another embodiment, WMAN 930 is operatively coupled to network 970 via base station(s) 960, 962, 964, or combinations thereof. Network 970 includes one or more network servers (not shown).

In one embodiment, wireless communication system 900 includes other suitable wireless communication networks, such as, for example, wireless mesh networks, shown as 980. In one embodiment, AP 950, base stations 960, 962, and 964 are associated with one or more wireless mesh networks. In one embodiment, AP 950 communicates with or operates as one of mesh points (MPs) 990 of wireless mesh network 980. In one embodiment, AP 950 receives and transmits data in connection with one or more of MPs 990. In one embodiment, MPs 990 include access points, redistribution points, end points, other suitable connection points, or combinations thereof for traffic flows via mesh paths. MPs 990 use any modulation techniques, wireless communication protocols, wired interfaces, or combinations thereof described above to communicate.

In one embodiment, wireless communication system 900 includes a wireless wide area network (WWAN), such as a cellular radio network (not shown). Laptop computer 940 operates in accordance with other wireless communication protocols to support a WWAN. In one embodiment, these wireless communication protocols are based on analog, digital, or dual-mode communication system technologies, such as, for example, Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, High-Speed Downlink Packet Access (HSDPA) technology, High-Speed Uplink Packet Access (HSUPA) technology, other suitable generation of wireless access technologies (e.g., 3G, 4G, etc.) standards based on these technologies, variations and evolutions of these standards, and other suitable wireless communication standards. Although FIG. 4 depicts a WPAN, a WLAN, and a WMAN, in one embodiment, wireless communication system 900 includes other combinations of WPANs, WLANs, WMANs, and WWANs. The methods and apparatus described herein are not limited in this regard.

In one embodiment, wireless communication system 900 includes other WPAN, WLAN, WMAN, or WWAN devices (not shown) such as, for example, network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, other suitable communication system, or combinations thereof.

In one embodiment, subscriber stations (e.g., 940, 942, 944, 946, and 948) AP 950, or base stations (e.g., 960, 962, and 964) includes a serial interface, a parallel interface, a small computer system interface (SCSI), an Ethernet interface, a universal serial bus (USB) interface, a high-performance serial bus interface (e.g., IEEE 1394 interface), any other suitable type of wired interface, or combinations thereof to communicate via wired links. Although certain examples have been described above, the scope of coverage of this disclosure is not limited thereto.

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

FIG. 5 illustrates an example of a computer system in conjunction with one embodiment of the invention. Processor 705 accesses data from level 1 (L1) cache memory 706, level 2 (L2) cache memory 710, and main memory 715. In other embodiments of the invention, cache memory 706 may be a multi-level cache memory comprise of an L1 cache together with other memory, such as an L2 cache within a computer-system memory hierarchy and cache memory 710 are the subsequent lower-level cache memory, such as an L3 cache or more multi-level cache. Furthermore, in other embodiments, the computer system may have cache memory 710 as a shared cache for more than one processor core.

In one embodiment, memory/graphic controller 716, IO controller 717, or combinations thereof is integrated in processor 705. In one embodiment, parts of memory/graphic controller 716, parts of IO controller 717, or combinations thereof is integrated in processor 705.

Processor 705 may have any number of processing cores. Other embodiments of the invention, however, may be implemented within other devices within the system or distributed throughout the system in hardware, software, or some combination thereof.

Main memory 715 may be implemented in various memory sources, such as dynamic random-access memory (DRAM), hard disk drive (HDD) 720, solid-state disk 725 based on NVRAM technology, or a memory source located remotely from the computer system via network interface 730 or via wireless interface 740 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 5. Furthermore, other embodiments of the invention may be distributed throughout several circuits, logic units, or devices illustrated in FIG. 5.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include, but are not limited to, processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method for protecting medium access control (MAC) control messages in a wireless communication network comprising:
   determining, by a network device, that a first MAC control message content is protected if an indicator within the first MAC control message content is set;
   validating, if the indicator is set, integrity of the first MAC control message content in conjunction with a cipher-message authentication code (CMAC) tuple concatenated with the first MAC control message content, the CMAC tuple comprising a portion of a CMAC value that is truncated to a first predetermined number of most-significant bits of the CMAC value;
   locating the CMAC tuple in the MAC control message based on a byte alignment of the CMAC tuple in the MAC control message, wherein a length of the first MAC control message content has been padded to provide byte alignment of the CMAC tuple; and
   decoding the MAC control message using the CMAC tuple.

2. The method of claim 1, wherein first MAC control message content is coupled with padding bits if a packed encoding rule with byte unaligned option is applied.

3. The method of claim 1, further comprising discarding the first MAC control message content if the validating fails.

4. The method of claim 1, further comprising determining that the first MAC control message content is not protected if the indicator does not exist.

5. The method of claim 1, wherein a first payload contains the first MAC control message content and the CMAC tuple, wherein the first payload is not modified prior to extracting the CMAC tuple.

6. The method of claim 1, wherein a first payload contains the first MAC control message content and the CMAC tuple, wherein the first MAC control message content is to be merged with a second MAC control message content from a second payload if the first MAC control message content and the second MAC control message content are MAC control message fragments.

7. The method of claim 1, further comprising detecting presence of the indicator or whether the indicator is set or otherwise only if the first MAC control message content is one of the message types including RNG-REQ, PKM-REQ, and PKM-RSP.

8. The method of claim 1, wherein a first payload comprises the first MAC control message content with the indicator set, wherein a second payload comprises a second MAC control message content without the indicator or with the indicator is clear, wherein the first payload is at least 12 bytes longer than the second payload if the first MAC control message content and the second MAC control message content are of a same length.

9. A method for protecting medium access control (MAC) control messages in a mobile communication network comprising:
   setting an indicator within a MAC control message content if the MAC control message content is to be authenticated in conjunction with a cipher-message authentication code (CMAC) tuple;

clearing the indicator if the MAC control message content is not to be authenticated in conjunction with the CMAC tuple;

generating a CMAC value based at least on the MAC control message content; and generating a first payload comprising the MAC control message content with the indicator and the CMAC tuple which includes a portion of the CMAC value truncated to a first predetermined number of most-significant bits of the CMAC value; and aligning the CMAC tuple in the MAC control message by padding the MAC control message content if byte alignment is needed, wherein a length of the MAC control message content is padded to provide byte alignment of the CMAC tuple.

10. The method of claim 9, further comprising dividing the MAC control message content into two or more fragments, wherein the CMAC value is generated based at least on the MAC control message content, wherein the first payload comprises a fragment of the MAC control message content and the CMAC tuple.

11. The method of claim 9, wherein a second payload comprises a second MAC control message content without the indicator or with the indicator is clear, wherein the first payload is at least N bytes longer than the second payload if the first MAC control message content and the second MAC control message content are of a same length.

12. A network system comprising:
a processor;
a memory coupled to the processor; and
a communication device coupled to the processor to communicate wirelessly over multiple sub-channels in an orthogonal frequency division multiple access (OFDMA) wireless network, wherein the communication device is operable to
determine that a first media access control (MAC) control message content is protected if an indicator within the first MAC control message content is set;
validate, if the indicator is set, integrity of the first MAC control message content in conjunction with a first cipher-message authentication code (CMAC) tuple concatenated with the first MAC control message content, the CMAC tuple comprising a portion of a CMAC value that is truncated to a first predetermined number of most-significant bits of the CMAC value;

locate the CMAC tuple in the MAC control message based on a byte alignment of the CMAC tuple in the MAC control message, wherein a length of the first MAC control message content has been padded to provide byte alignment of the CMAC tuple; and decode the MAC control message using the CMAC tuple.

13. The system of claim 12, wherein the communication device is operable to further determine that the first MAC control message content is not to be protected if the indicator does not exist.

14. The system of claim 12, wherein a first payload comprises the first MAC control message content with the indicator set, wherein a second payload comprises a second MAC control message content without the indicator or with the indicator is clear, wherein the first payload is 12 bytes longer than the second payload if the first MAC control message content and the second MAC control message content are of a same length.

15. The system of claim 12, wherein the communication device is operable to
set an indicator within a second MAC control message content if the second MAC control message content is to protected in conjunction with a second CMAC tuple;
generate a CMAC value based at least on the second MAC control message content; and
generate a first payload comprising the second MAC control message content with the indicator set and the second CMAC tuple which includes at least a part of the CMAC value.

16. The method of claim 1, wherein the first predetermined number of most-significant bits comprises 64 bits.

17. The method of claim 16, further comprising generating the CMAC value based on an encryption of the first MAC control message content.

18. The method of claim 9, wherein the first predetermined number of most-significant bits comprises 64 bits, and
wherein the CMAC value that is generated based on an encryption of the first MAC control message content comprises 128 bits.

19. The system of claim 12, wherein the first predetermined number of most-significant bits comprises 64 bits.

20. The system of claim 19, wherein the communication device is operable to further generate the CMAC value based on an encryption of the first MAC control message content.

* * * * *